UNITED STATES PATENT OFFICE.

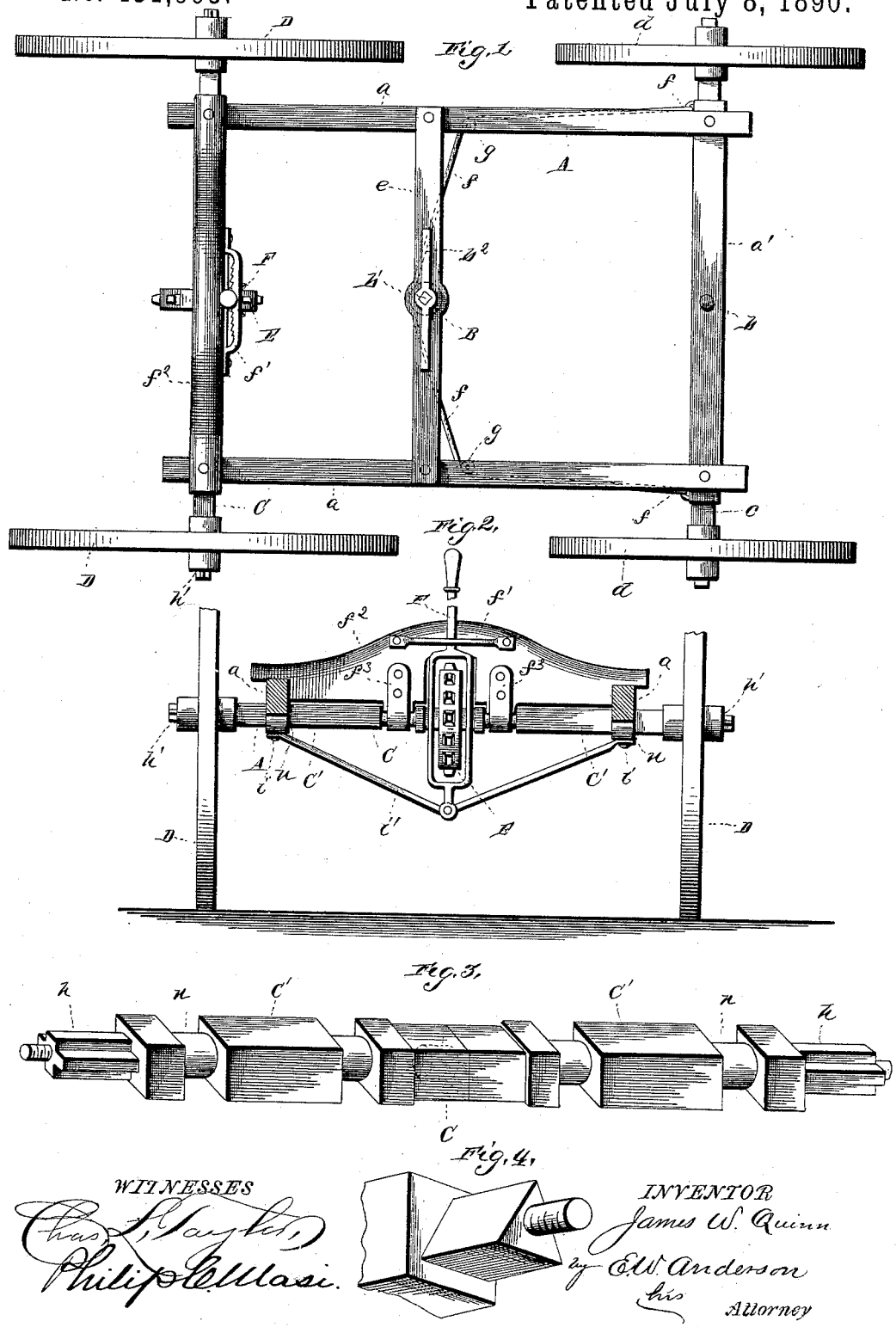

JAMES W. QUINN, OF NORTH MADISON, INDIANA, ASSIGNOR OF TWO-THIRDS TO CHARLES C. COPELAND, OF SAME PLACE, AND WILLIAM M. COPELAND, OF MADISON, INDIANA.

MOTOR-VEHICLE.

SPECIFICATION forming part of Letters Patent No. 431,993, dated July 8, 1890.

Application filed February 24, 1890. Serial No. 341,542. (No model.)

*To all whom it may concern:*

Be it known that I, JAMES W. QUINN, a citizen of the United States, and a resident of North Madison, in the county of Jefferson and State of Indiana, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view. Fig. 2 is a rear view, and Figs. 3 and 4 are detail views.

The object of my invention is to provide a cheap, simple, safe, and effective device for propelling carriages, wagons, and similar vehicles by means of a suitable motor or motors the motive power of which may be steam, electricity, gas, or compressed air, without the use of horses or other beasts of burden; and it consists of the novel construction and combination of parts, as will appear from the following description and the accompanying drawings.

In the drawings, A refers to the frame, which comprises two longitudinal or side bars $a$, and a forward cross-bar $a'$, which receives the king-bolt $b$ of the front axle $c$, having the usual forward wheels $d$.

B is a drum whose shaft $b'$, which has a handle $b^2$ for its rotation, is journaled in parallel cross-pieces $e$ $e$, secured to the side bars $a$ a short distance in rear of said forward axle. Lines, chain, or other suitable medium $f$ are connected to the forward axle and pass back in contact with pulleys $g$, hung upon the under side of the side bars $a$, and are wound around the drum B in opposite directions, whereby as one line is wound thereon, the other line will be unwound therefrom, and vice versa. The aforesaid arrangement of parts provides for the ready steering of the vehicle by the operator suitably seated thereon.

C is the hind axle, which consists of two parts or sections $C'$ $C'$, having cylindric portions $n$, turning in bearings $i$, secured to the under side of the side bars $a$, at their rear ends. The axle-sections $C'$ are provided at their outer ends with prismatic or angular extensions $h$, which engage corresponding passages or apertures $h'$ in the hubs of the hind wheels D to cause the latter to turn therewith, and yet the connection between said extensions and the wheels is to be such as to permit the wheels to have a limited amount of play thereon. The purpose of this is to overcome the force of jars and blows received upon the hind wheels, thereby lessening the liability of breaking the axle, which otherwise would be very great. The meeting ends of the axle-sections $C'$ $C'$ are square or other suitable angular shape and have fitted thereon a sprocket or tooth wheel E, whose hub is of corresponding shape and is normally held so as to inclose and couple said meeting ends of said axle-sections, causing both axle-sections to revolve together.

A chain (not shown) is designed to connect the wheel E with a motor (not shown) suitably located on the vehicle and driven by steam, electricity, gas, or compressed air, thus dispensing with horses or other beasts of burden in propelling the vehicle.

F is a yoke-lever, pivoted to a bracket $i'$, secured at its ends to the side bars of the frame A. The lever F engages a rack $f'$, secured to a yoke or cross-bar $f^2$, secured to the frame A and having bearings or hangers $f^3$ for the axle-sections. The yoke-lever F is adapted to act upon and effect the shifting of the wheel E from one axle-section to the other, according to the section it is desired to release. The purpose of this is to facilitate turning around in a smaller area than could be done with the ordinary vehicle, the axle-section on the shorter side of the curve being unshipped from the wheel E, which, as above intimated, couples the two axle-sections together.

I do not limit myself to any particular construction of side bars or revolving axle, neither do I restrict myself to the particular construction and arrangement of the steering apparatus herein shown and described; but modifications within the range of my improvement may be made without departing from the spirit of my invention or sacrificing the advantages thereof.

Having described this invention, what I claim, and desire to secure by Letters Patent, is—

In a vehicle, the combination, with the carrying-frame, of the axle-sections bearing the hind wheels adapted to turn therewith, and yet have a limited movement thereon, the sprocket or toothed wheel adapted to couple the meeting or opposite ends of said axle-sections, and to slide thereon, and the shifting-lever or yoke engaging said sprocket or toothed wheel, substantially as specified.

In testimony whereof I affix my signature in presence of two witnesses.

JAMES W. QUINN.

Witnesses:
JOHN M. GOLDEN,
C. A. KORBLY.